Figure 1:
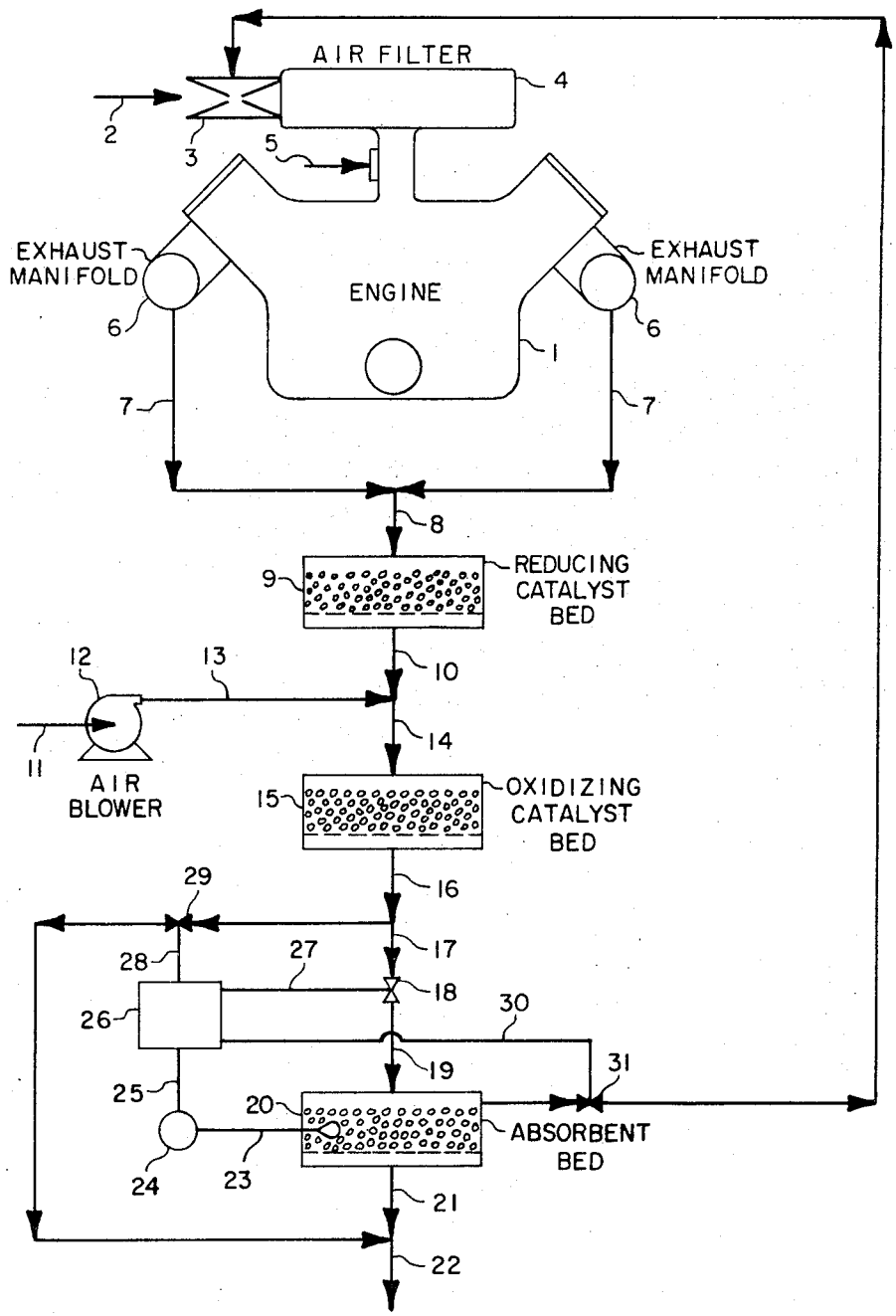

United States Patent
Tourtellotte et al.

[15] 3,699,683
[45] Oct. 24, 1972

[54] ENGINE EXHAUST EMISSION CONTROL SYSTEM

[72] Inventors: John F. Tourtellotte, Westfield; John S. Negra, Plainfield; Abe Warshaw, Matawan; John F. Villiers-Fisher, Kendall Park, all of N.J.

[73] Assignee: Chemical Construction Corporation, New York, N.Y.

[22] Filed: April 5, 1971

[21] Appl. No.: 131,279

[52] U.S. Cl.....................60/274, 23/2 E, 23/288 F, 55/DIG. 30, 60/279, 60/284, 60/297, 60/301
[51] Int. Cl..........F01n 3/14, F01n 3/16, F02b 75/10
[58] Field of Search........60/278, 279, 274, 284, 286, 60/301, 297; 23/2 E, 288 F; 55/DIG. 30

[56] References Cited

UNITED STATES PATENTS

| | | |
|---|---|---|
| 2,673,446 | 3/1954 | Salardi.........................60/297 |
| 2,942,932 | 6/1960 | Elliott..........................60/297 |
| 3,228,746 | 1/1966 | Howk..........................60/301 |
| 3,645,098 | 2/1972 | Templin.......................60/297 |

FOREIGN PATENTS OR APPLICATIONS 1,014,498  12/1965  Great Britain............23/288 F

*Primary Examiner*—Douglas Hart
*Attorney*—J. L. Chaboty

[57] ABSTRACT

A system for the prevention of hydrocarbon emissions from engines during start up is provided, in which a cold engine generates an exhaust gas rich in unburned or thermally degraded hydrocarbons. The exhaust gas is passed through a hydrocarbon absorbent bed prior to atmospheric discharge, so that hydrocarbon vapor is absorbed in the bed. When the engine and exhaust gas are hot, and hydrocarbon emission low, most of the exhaust gas is discharged directly to atmosphere and the absorbent bed is regenerated by passing a small stream of hot exhaust gas through the bed. The resulting gaseous mixture of exhaust gas plug desorbed hydrocarbon vapor is recycled to the engine.

11 Claims, 2 Drawing Figures

JOHN F. TOURTELLOTTE
JOHN S. NEGRA
ABE WARSHAW
JOHN F. VILLIERS-FISHER
INVENTORS

JOHN F. TOURTELLOTTE
JOHN S. NEGRA
ABE WARSHAW
JOHN F. VILLIERS-FISHER
INVENTORS.

ENGINE EXHAUST EMISSION CONTROL SYSTEM

BACKGROUND OF THE INVENTION

1. Field of the Invention

The invention relates to the prevention of air pollution due to the emission of unburned or thermally degraded hydrocarbons in the exhaust gas of engines, such as internal combustion engines as provided for automobiles, trucks, buses or the like. In recent years it has bee recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas after initial catalytic reduction of nitrogen oxides, followed by catalytic oxidation of residual hydrocarbons, carbon monoxide, etc., in various types of apparatus or catalytic mufflers specially designed for this purpose.

The invention relates particularly to catalytic exhaust gas treatment systems in which air is added to the exhaust gas, and the resulting mixture is passed through a catalyst bed to catalytically oxidize noxious unburned or thermally degraded hydrocarbon vapors or other organic vapors to innocuous products such as carbon dioxide and water vapor. This procedure, during steady state operation with a hot engine and hot exhaust gas, results in the elimination of these deleterious components initially present in the exhaust gas from external or internal combustion engines such as jet engines, gas turbines, diesel engines or gasoline-burning automobile, bus and truck engines, so as to prevent the discharge of these noxious components including unburned hydrocarbons, other organic vapors and carbon monoxide into the atmosphere, and thereby prevent air pollution.

2. Description of the Prior Art

Numerous catalysts, catalytic devices and mufflers, and treatment systems have been proposed for the processing of exhaust gas emitted by engines, so as to control engine exhaust emissions and prevent the discharge of noxious components into the atmosphere. Among the many patents relating to catalysis and catalytic formulations may be mentioned U.S. Pat. Nos. 3,053,773; 3,429,656; 3,316,057; 3,398,101; 3,477,893 and 3,476,508, and U.S. Pat. application Ser. Nos. 55,998 filed July 17, 1970 and 45,576 filed June 11, 1970. Apparatus for carrying out the procedure are described in U.S. Pat. Nos. 3,380,810; 3,325,256; 3,255,123; 3,222,140; 3,186,806; 3,180,712; 3,169,836; 3,168,806; 3,146,073 and 3,086,839 and U.S. Pat. application Ser. No. 33,359 filed Apr. 30, 1970, now U.S. Pat. No. 3,656,915, which describes a two-stage apparatus for carrying out the process with interstage air injection. In general, the prior art as enumerated supra does not accommodate for high emissions and concentrations of unburned hydrocarbon vapors in the exhaust gas during certain periods of the engine operating cycle, such as at startup of a cold engine.

SUMMARY OF THE INVENTION

In the present invention, a method and apparatus system are provided for the treatment of engine exhaust gas containing relatively large proportions of unburned or thermally degraded hydrocarbons or other organics. The term hydrocarbons will be understood to encompass all of these types of components. Engine exhaust gas containing high amounts or concentrations of these components is generally produced during the first few minutes of start-up of an engine, especially when the engine is cold at start-up. The present invention is especially applicable to systems in which oxidizable noxious components in engine exhaust gas, such as hydrocarbons and carbon monoxide, are selectively oxidized to innocuous components by adding air to the exhaust gas and passing the gaseous mixture through a catalyst bed, to attain an exothermic catalytic reaction which destroys the noxious components.

The method and system of the present invention entails treatment of the relatively cold exhaust gas-air mixture discharged from the catalyst bed during the first few minutes of engine operation and containing a relatively large proportion of residual hydrocarbon vapor. This cold gaseous mixture is passed through a bed of discrete solid particles of a suitable absorbent agent which selectively absorbs the hydrocarbon vapor, so that the residual gaseous phase may be safely discharged to atmosphere without causing air pollution. The absorbent bed becomes laden with absorbed hydrocarbon during this initial period of operation, which may be of a duration of one to ten minutes, depending on atmospheric or initial engine temperature or the type of engine.

During subsequent normal operation of the engine at elevated temperatures and with reduced emission of hydrocarbon vapor, the exhaust gas discharged from the catalyst bed is fully reacted with the added secondary air and may be safely discharged to atmosphere. However, this exhaust gas is at elevated temperature, and a minor portion of the hot exhaust gas is continually passed through the absorbent bed to desorb hydrocarbon vapors. The resulting mixture of desorbed hydrocarbon vapors and exhaust gas is recycled to the intake appurtenances of the engine, so that most or all of the recycled desorbed hydrocarbon vapor is burned in the engine. The recycled of the laden exhaust gas stream to the engine may take place by inducting the exhaust gas stream into the intake of the engine air filter, and preferably into the throat section of a venturi mixer, and passing all or a portion of the primary combustion air stream through the venturi mixer, prior to passing the primary air to the engine air filter or intake manifold.

The principal advantage of the present invention is that the emission of hydrocarbon vapors from the engine during the critical start-up or warm-up period, when the concentration of hydrocarbon in the generated exhaust gas is very high, is effectively prevented. Another advantage is that fuel consumption by the engine is lowered to a certain extent, since the desorbed hydrocarbon vapors are recycled to the engine intake for combustion in the engine during normal engine operation. Another advantage is that the system and apparatus is readily fabricated and installed, and does not require manual operation. A further advantage is that the system is of low cost.

It is an object of the present invention to provide an improved method and system for preventing air pollution due to discharge of hydrocarbon vapors in the exhaust gas of an engine.

Another object is to prevent the emission into the atmosphere of hydrocarbon vapors discharged from an engine.

An additional object is to recover and recycle hydrocarbon vapors, discharged in the exhaust gas from an engine, back to the engine intake for subsequent combustion.

A further object is to increase the efficiency of an engine, by recovering hydrocarbon vapors for usage as a fuel.

Still another object is to prevent the emission of hydrocarbon vapors into the atmosphere during the start-up and initial operational periods of an engine operating cycle, when the concentration of hydrocarbon vapors in the exhaust gas reaches high levels.

These and other objects and advantages of the present invention will become evident from the description which follows.

DESCRIPTION OF THE DRAWINGS AND PREFERRED EMBODIMENTS

Figure 2:
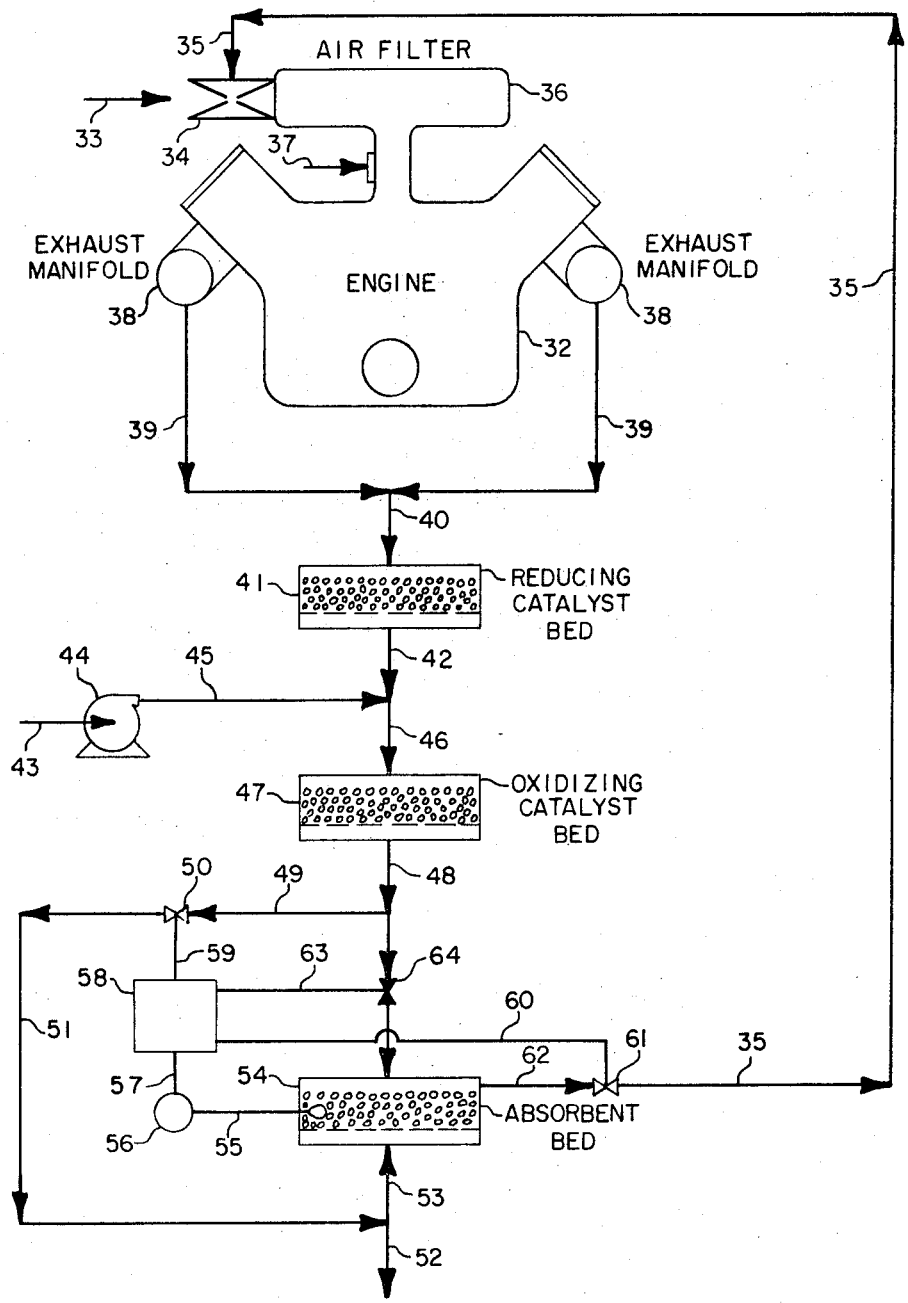

Referring to the drawings:

FIG. 1 shows operation of the method and device during the start-up or warm-up period of a cold engine, when the emission of hydrocarbon vapors in the exhaust gas far exceeds the normal concentration of these vapors in the exhaust gas, and FIG. 2 shows operation of the method and device during normal steady state operation of the engine, with recycle of hydrocarbon vapors to the engine.

In FIGS. 1 and 2, valves which are closed are shown in solid black.

Referring now to FIG. 1, the engine 1 consists of any internal or external combustion engine which generates an exhaust gas stream containing noxious components including unburned or thermally degraded hydrocarbons or similar organics. Other noxious components usually present in the exhaust gas generated by engine 1 include nitrogen oxides and carbon monoxide. Engine 1 may consist of a jet engine, gas turbine, internal combustion engine, such as a gasoline-burning automobile, truck or bus engine, a diesel engine, or the like. Engine 1 in this embodiment of the invention is a gasoline-burning internal combustion engine mounted in an automobile, not shown. Under the conditions of the embodiment of the invention shown in FIG. 1, engine 1 is operating at a relatively reduced temperature, such as a cold engine at start-up or warm-up, or under other conditions which produce a relatively high concentration of hydrocarbon vapors in the exhaust gas.

The engine 1 inducts air for combustion via air stream 2, which may consist of all or a portion of the total combustion air passing into engine 1. Air stream 2 flows through venturi aspirator-mixer 3, which, as will appear infra in discussion of FIG. 2, serves to induct recycle exhaust gas laden with hydrocarbon vapors in the engine 1 during subsequent elevated temperature operation of the device. In this FIG. 1 phase of the operating cycle, only stream 2 flows through unit 3 and into air filter 4. Gasoline injected via stream 5 mixes with the combustion air flowing downwards from air filter 4, and the resulting gaseous mixture is reacted and burned in engine 1, to produce power and an exhaust gas at a temperature generally below 200° C and typically in the range of 50° to 200° C, which contains noxious components including a high concentration of hydrocarbon vapor, as well as nitrogen oxides and carbon monoxide. The exhaust gas is removed from the banks of cylinders in engine 1 via exhaust manifolds 6, and the individual exhaust gas streams 7 are combined to form cold exhaust gas stream 8 which is at a temperature generally below 200° C and typically in the range of 50° to 200° C. Stream 8 is produced at this relatively low temperature level during the initial duration of engine operation, typically for the first 10 to 15 minutes after startup of a cold engine, except that in some instances, such as when the ambient temperature is relatively high, stream 8 may be produced at low temperature for about 1 to 5 minutes.

Stream 8 will typically contain, by volume, 0.5 percent to 3 percent hydrocarbon vapor due to cold startup, as compared to normal quantities of about 0.1 percent or less. Stream 8 will also contain nitrogen oxides and carbon monoxide, and stream 8 is preferably initially processed to deplete the nitrogen oxides concentration by catalytic reduction. Stream 8 flows into catalyst container 9 which contains one or more beds of a suitable reducing catalyst for the reduction of nitrogen oxides to innocuous nitrogen by reaction with the hydrocarbon vapors and/or carbon monoxide contained in the exhaust gas. This reaction may not go to completion during the initial stages of engine operation because of the low temperature of stream 8 and the resultant low temperature of the catalyst in unit 9. In any case, typical catalysts or catalyst formulations for attaining this reduction reaction are nickel, cobalt, manganese or copper, or mixtures thereof, deposited on a suitable carrier such as alumina, kaolin, etc. The active metallic constituents may be present in the catalyst formulation in the metallic state, as oxides or reduced oxides, or as salts. Other catalysts such as those specified in the patents and applications enumerated supra may also be employed in unit 9.

The resulting exhaust gas stream 10 discharged from container 9 is now usually depleted in nitrogen oxides content, however stream 10 contains a high concentration of residual hydrocarbon vapors together with carbon monoxide. The residual hydrocarbon vapors may now be partially oxidized, however, the major portion of hydrocarbon vapors in stream 10 are recovered for recycle as will appear infra. During subsequent steady state operation of the system, the smaller concentrations of residual hydrocarbons and carbon dioxide in stream 10 are eliminated by air addition followed by catalysis. Air stream 11 is passed via fan or blower 12 as stream 13 for addition to stream 10, and the resulting combined gaseous mixture stream 14 flows into container 15 which contains discrete particles of an oxidizing catalyst or catalyst formulation. During this FIG. 1 phase of the operating cycle of the system, a minimal reaction may occur in unit 15 due to low temperature. The operation of the oxidizing catalyst bed will be described in detail infra in discussion of FIG. 2.

The resulting exhaust gas stream 16 discharged from unit 15 still contains a high residual proportion or concentration of residual hydrocarbon vapors, which are now recovered in accordance with the present invention. Stream 16 passes via stream 17, open valve 18 and stream 19 into container 20, which contains one or more beds of a suitable absorbent or adsorbent for hydrocarbon vapors. The hydrocarbon vapors are thus removed from the exhaust gas stream and deposited on or within the discrete solid particles of absorbent or adsorbent within unit 20. Any suitable solid material to provide the absorption or adsorption function may be provided within unit 20. Typical usable materials include activated carbon such as charcoal, natural or artificial zeolites, activated alumina, fuller's earth, kaolin, organic resins and the like, which may be employed either singly or in mixtures.

The resulting treated exhaust gas stream 21 discharged from unit 20 now has a very low or negligible content of residual hydrocarbon vapors, and during the onset interval of engine operation stream 21 will be essentially free of hydrocarbon vapors. Stream 21 may now be safely discharged to atmosphere via stream 22 without causing air pollution.

The temperature in the absorbent bed within unit 20 is measured by temperature sensing element 23, which typically consists of a thermometer, thermocouple, or a fluid-filled bulb within the catalyst bed which transmits fluid pressure responsive to temperature, or other suitable signal, to temperature indicating element 24 which is preferably mounted on the dashboard of the automobile. In this FIG. 1 embodiment of the invention, element 24 typically indicates a temperature which is below about 200° C in the absorbent bed within unit 20, during this interval or period of the invention.

Element 24 also transmits a signal or control setting via line 25 to relay 26, which electrically or pneumatically transmits a signal via line 27 to control and open valve 18, via line 28 to control and close valve 29, and via line 30 to control and close valve 31.

Referring now to FIG. 2, operation of the method and system of the present invention during normal operating conditions, when the engine has reached elevated temperature and steady state performance is illustrated. In this case, the engine, now designated as 32, is under a normal load and is discharging an exhaust gas which is of typical elevated temperature level and contains normal concentrations of noxious components. Engine 32 receives combustion air stream 33, which flows through venturi aspirator-mixer 34 and inducts or aspirates the recycle exhaust gas-hydrocarbon vapor stream 35, which is derived in a manner to be described infra. The resulting gaseous mixture flows from the venturi aspirator 35 into air filter 36, and mixes with gasoline feed stream 37 to provide a gaseous combustion mixture to the engine 32. The mixture is burned in the cylinders of engine 32 to produce power and a hot exhaust gas, which is typically discharged into exhaust manifolds 38 at a temperature generally in the range of 200° to 600° C.

Hot exhaust gas flows from the exhaust manifolds 38 via streams 39, which are combined to form exhaust gas stream 40, which is generally at a temperature above 200° C and typically in the range of 200° to 600° C and which usually contains less than about 0.1 percent by volume of hydrocarbon vapors, together with other noxious components including nitrogen oxides and carbon monoxide. Stream 40 flows into the reducing catalyst bed in container 41, in which the reduction of nitrogen oxides to elemental nitrogen takes place as described supra. Essentially total elimination of nitrogen oxides from the exhaust gas stream takes place within unit 41.

The resulting exhaust gas stream 42 discharged from container 41 is now depleted or essentially devoid of nitrogen oxides, however stream 42 contains residual hydrocarbons and carbon monoxide which are eliminated by air addition followed by catalysis. Air stream 43 is passed via fan or blower 44 as stream 45 for addition to stream 42, and the resulting combined gaseous mixture stream 46, now containing a viable proportion of free oxygen, typically from 1 to 10 percent by volume, flows into container 47 which contains discrete particles of an oxidizing catalyst or catalyst formulation which catalytically oxidizes most or all of the residual hydrocarbons and carbon monoxide in stream 46 to innocuous products such as water vapor and carbon dioxide. The catalyst bed in unit 47 typically consists of oxides or reduced oxides or salts of nickel, cobalt, manganese or copper, or mixtures thereof, or elemental metals, deposited on a suitable carrier such as alumina, kaolin, silica or the like. Other suitable catalyst formulations may be employed in unit 47, such as those described in the patents and applications enumerated supra. An exothermic catalytic reaction takes place in the bed within unit 47 between free oxygen and residual hydrocarbon vapors and/or carbon monoxide, whereby these noxious components derived from the exhaust gas are oxidized to innocuous water vapor and carbon dioxide. The resulting hot fully converted gaseous mixture, now at a temperature typically in the range of 250° to 700° C and essentially devoid of noxious components, is removed from unit 47 via stream 48, and a portion of stream 48 is now utilized in accordance with the present invention.

Stream 48 flows via stream 49 and open valve 50 to the bypass line 51, which bypasses the absorbent bed, which is now laden with recovered hydrocarbon from prior operation as described supra. Stream 51 now divides into stream 52, which is discharged to atmosphere, and stream 53 which flows upwards into the absorbent bed in container 54 to desorb hydrocarbon vapor. The flow rate of 53 is generally less than about 20 percent of the overall flow rate of stream 51, and preferably about 5 to 15 percent of the stream 51 flow rate. The temperature of the bed within container 54 is measured by the temperature sensitive element 55, and when the temperature in the bed 54 rises and reaches a pre-determined level such as about 200° C, the valve settings are adjusted from the FIG. 1 positions to the settings shown in FIG. 2. Thus, the element 55 transmits a signal to the meter-controller 56, which in turn transmits a valve setting signal via line 57 to relay 58, which transmits a signal electrically or pneumatically or through a liquid-filled system or other means via line 59, to control and open valve 50 and via line 60 to open and control valve 61. The opening of valve 61 causes hot exhaust gas stream 53 to be drawn into unit 54 and flow upwards through the absorbent bed, so that previously absorbed or adsorbed hydrocarbon is desorbed into the hot exhaust gas at a temperature typically in the range of 250° to 700° C. The resulting gaseous mixture of exhaust gas and desorbed hydrocarbon vapor flows from unit 54 via stream 62, open valve 61 and stream 35 to the engine 32 as described supra. Relay 58 also transmits a signal via line 63 to control and close valve 64.

Numerous alternatives within the scope of the present invention will occur to those skilled in the art. Thus, the control system generally shown as units 23,24,25,26,27,28 and 30 in FIG. 1, and as units 55,56,57,58,59,60 and 63 in FIG. 2, may be replaced by suitable functionally equivalent devices or equipment in suitable instances. Thus, the operation may alternatively be controlled by time cycle relays or the like, so that valve 18 is open and valves 29 and 31 are closed during the first 10 to 15 minutes after startup of a cold engine, or during the first 1 to 5 minutes after startup when ambient temperatures are relatively high. Then, after the time period of relatively high hydrocarbon vapor emission has ended, the valve settings as shown in FIG. 2, with valve 64 closed and valves 50 and 61 open, would be automatically provided by the time cycle relay. The reducing catalyst bed, shown as unit 9 in FIG. 1 and 41 in FIG. 2, may not be provided in some instances, depending on the type of engine and the combustion reactions which take place therein. The temperature ranges and limitations enumerated supra will vary, depending on the type of engine, and the nature of the catalyst within the oxidizing catalyst bed, as well as the nature of the solid absorbent in the absorbent bed. In some instances, such as described in U.S. Pat. application Ser. No. 33,359 filed Apr. 30, 1970, now U.S. Pat. No. 3,656,915, the reducing and oxidizing catalyst beds will be integrally combined into a single device such as a catalytic muffler, and the same catalytic agent, known as a redox catalyst because of ability to catalyze both reducing and oxidizing reactions, may be employed in both catalyst beds. Any suitable means or device may be employed in practice to recycle the gaseous mixture of exhaust gas and desorbed hydrocarbon vapor to the engine, and this gaseous mixture may in some instances pass directly into the intake manifold of the engine. Numerous other alternatives within the scope of the present invention will occur to those skilled in the art.

Thus, the temperature sensing element 23 of FIG. 1, shown as unit 55 in FIG. 2, may alternatively extend into the oxidizing catalyst bed 15 or 47, instead of extending into the absorbent bed, or the temperature sensing element may even measure exhaust gas temperature prior to the oxidizing catalyst bed. In any case, the operating parameter of exhaust gas temperature is measured so as to control the settings of the valves 18, 29 and 31 of FIG. 1, shown as valves 64, 50 and 61 of FIG. 2. The recycle exhaust gas-desorbed hydrocarbon vapor control valve 31 or 61 may also be suitably controlled by an overtemperature controller, so that when the temperature of the recycle exhaust gas in the absorbent bed rises to a high level during high loading of the engine, the control valve 31 or 61 is closed to prevent overheating of the absorbent bed, which could lead to reduced or curtailed absorbent activity or capacity. Thus, a temperature sensor-control system could be provided to shut off control valve 31 or 61 when the temperature of the exhaust gas exceeds a temperature level such as 500° C, when the absorbent bed is composed of a material which is relatively unstable at high temperature, such as activated carbon. In some instances other control systems or devices may be provided, and in some cases, depending on the control arrangement which is selected, valve 31 may be open during initial operation of the engine, in which case recycle of exhaust gas would be continuous except for overtemperature conditions.

An example of the application of the method and system of the present invention to an automobile engine will now be described.

EXAMPLE

The present system was applied to a 350 cu. in. Oldsmobile 1971 Model engine. The internal combustion engine tested had the following parameters:

| | |
|---|---|
| Displacement | 350 cu. in. |
| Compression Ratio | 8.1/1 |
| Air-Fuel Ratio at 30 mph | 14.2 |
| Ignition Timing at 1100 RPM | 10° BTC |
| Fuel | Indolene |
| Engine Type | V8 |
| Automatic Transmission | Spark Control |

The engine was started in accordance with the normal manufacturer's recommended procedure. Following are operating conditions at startup as shown in FIG. 1, and during normal running conditions as shown in FIG. 2.

TABLE 1. - Cold Engine Startup (FIG. 1)-First 180 Sec.

Total Flow Through Absorber 20

Engine Speed Varied Idle To 45 mph in this Period

| Stream No. | Time Sec. | Temp. °C. | Concentration in Vol. % of hydrocarbons as hexane (average) | |
|---|---|---|---|---|
| | | | Without Abs. | With Absorber |
| 8 | 0–5 | 316 | 0.09 | 0.09 |
| | 5–180 | 371 | — | — |
| 10 | — | 110–338 | — | — |
| 16 | 0–25 | 38 | — | — |
| | 25–180 | 93 | | |
| 21 | — | 66 | 0.075 | 0.015 |

TABLE 11. — NORMAL ENGINE OPERATION (FIG. 2.

| Stream No. | Flow Rate | Temp. °C | Engine Speed | Concentration in Vol. % of hydrocarbons as hexane |
|---|---|---|---|---|
| | CFM | | MPH | |
| 35 | 3.5 | 60 | 30 | tn 0.015 |
| 40 | — | | 30 | 0.167 |
| 43 | 10.0 | 30 | 30 | — |
| 48 | 45.0 | 550 | 30 | 0.015 |

The reducing and oxidizing catalyst beds were a mixture of cobalt, manganese and copper deposited on an alumina carrier, and the absorbent bed was activated carbon.

We claim:

1. In an engine exhaust emission control system in which an engine fueled by a hydrocarbon is operated during an initial time period when the exhaust gas stream discharged from said engine is rich in unburned hydrocarbon and at a temperature below 200° C, followed by a subsequent time period when said engine is operated at normal operating temperature, whereby said exhaust gas stream is discharged from said engine with low unburned hydrocarbon content and at a temperature above 200° C, a stream of air is added to said exhaust gas stream during said time period and said exhaust gas stream containing added air is passed through a bed of oxidizing catalyst for the conversion of unburned hydrocarbon to innocuous oxidized products, the improved method of preventing a substantial discharge into the atmosphere of unburned hydrocarbon during said initial time period, said bed of oxidizing catalyst being at a temperature below the normal temperature range of high catalytic activity during said initial time period, which comprises passing said exhaust gas stream discharged from said bed of oxidizing catalyst during said initial time period at reduced temperature and containing unburned hydrocarbon, through a bed of solid absorbent whereby unburned hydrocarbon is absorbed from said exhaust gas stream into said solid absorbent during said initial time period, dividing said exhaust gas stream discharged from said bed of oxidizing catalyst during said subsequent time period at elevated temperature and substantially free of unburned hydrocarbon into a major portion and a minor portion, discharging said major portion of said hot exhaust gas stream, passing said minor portion of said hot exhaust gas stream through said bed of solid absorbent, whereby unburned hydrocarbon is desorbed from said solid absorbent into said minor portion of said hot exhaust gas stream during said subsequent time period, and passing the resulting minor portion of said hot exhaust gas stream containing desorbed unburned hydrocarbon into said engine, whereby at least a portion of said desorbed unburned hydrocarbon is burned in said engine.

2. The method of claim 1, in which said engine is an internal combustion engine.

3. The method of claim 2, in which said internal combustion engine is an automobile engine.

4. The method of claim 1, in which said oxidizing catalyst is selected from the group consisting of oxides of nickel, cobalt, manganese and copper, and mixtures thereof, deposited on a carrier, and said solid absorbent is selected from the group consisting of activated carbon, zeolite, activated alumina, fuller's earth, kaolin, and organic resin.

5. The method of claim 1, in which said resulting minor portion of said hot exhaust gas stream containing desorbed unburned hydrocarbon is passed into said engine by aspirating said resulting minor portion of said hot exhaust gas stream into the throat section of a venturi inlet passage to said engine, and passing at least a portion of the combustion air feed stream to said engine through said venturi inlet passage.

6. The method of claim 1, in which said engine discharges said exhaust gas stream at a temperature in the range of 200° to 600° C during said subsequent time period.

7. A system for engine exhaust emission control which comprises an engine, means to pass a fluid hydrocarbon and combustion air to said engine, whereby said fluid hydrocarbon is at least partially combusted with said combustion air by said engine, and power and an exhaust gas containing residual hydrocarbon vapor are generated, means to add air to said exhaust gas and thereby form a gaseous mixture containing excess free oxygen, a catalyst bed, said catalyst bed containing an active oxidizing catalyst for the oxidation of hydrocarbon vapor in said gaseous mixture, means to pass said gaseous mixture through said catalyst bed, whereby a portion of the residual hydrocarbon vapor in said gaseous mixture is selectively oxidized to innocuous products, an absorbent bed, said absorbent bed containing an active absorbent for hydrocarbon vapor, means to pass the reacted gaseous mixture discharged from said catalyst bed through said absorbent bed, whereby residual hydrocarbon vapor is absorbed into said absorbent bed, means to measure the temperature of the hot reacted gaseous mixture within said absorbent bed, bypass means between said catalyst bed and said absorbent bed for direct discharge of a portion of said hot reacted gaseous mixture to atmosphere, said temperature measuring means serving to open said bypass means when the temperature in said absorbent bed reaches an elevated level, and means to recycle the balance of said hot reacted gaseous mixture containing desorbed hydrocarbon vapor from said absorbent bed to said engine.

8. The system of claim 7, in which said engine is an internal combustion engine.

9. The system of claim 8, in which said internal combustion engine is an automobile engine.

10. The system of claim 7, in which said oxidizing catalyst is selected from the group consisting of oxides of nickel, cobalt, manganese and copper, and mixtures thereof, deposited on a carrier, and said solid absorbent is selected from the group consisting of activated carbon, zeolite, activated alumina, fuller's earth, kaolin, and organic resin.

11. The system of claim 7, in which said means to recycle the balance of said hot reacted gaseous mixture containing desorbed hydrocarbon vapor from said absorbent bed to said engine comprises a venturi mixer provided with a throat section, means to pass at least a portion of the combustion air feed stream to said engine through said venturi mixer, means to pass said balance of the hot reacted gaseous mixture to said throat section of said venturi mixture, whereby said balance of the hot reacted gaseous mixture containing desorbed hydrocarbon vapor is aspirated into said venturi mixer, and means to pass the resulting mixture of combustion air feed stream and hot reacted gaseous mixture containing desorbed hydrocarbon vapor to said engine.

* * * * *